(12) United States Patent
Iijima (10) Patent No.: US 8,493,735 B2
(45) Date of Patent: Jul. 23, 2013

(54) LIQUID COOLING ARRANGEMENT FOR ELECTRONIC APPARATUS

(75) Inventor: Takashi Iijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 12/910,194

(22) Filed: Oct. 22, 2010

(65) Prior Publication Data

US 2011/0110043 A1    May 12, 2011

(30) Foreign Application Priority Data

Nov. 12, 2009   (JP) ................................ 2009-258578

(51) Int. Cl.
*H05K 7/20*   (2006.01)
(52) U.S. Cl.
USPC ....... 361/699; 361/698; 361/701; 361/679.53
(58) Field of Classification Search
USPC .............................. 361/698, 699, 701, 679.53
See application file for complete search history.

(56) References Cited

U.S. PATENT DOCUMENTS

| | | | | |
|---|---|---|---|---|
| 6,118,654 | A * | 9/2000 | Bhatia ....................... | 361/679.52 |
| 6,181,553 | B1 * | 1/2001 | Cipolla et al. ............ | 361/679.54 |
| 6,259,601 | B1 * | 7/2001 | Jaggers et al. ................ | 361/690 |
| 6,276,448 | B1 * | 8/2001 | Maruno ......................... | 165/185 |
| 6,453,378 | B1 * | 9/2002 | Olson et al. ................... | 710/304 |
| 6,711,014 | B2 * | 3/2004 | Anzai et al. ............. | 361/679.48 |
| 6,826,047 | B1 * | 11/2004 | Chen et al. .............. | 361/679.47 |
| 6,966,358 | B2 * | 11/2005 | Rapaich ....................... | 165/80.4 |
| 7,068,503 | B2 * | 6/2006 | Kamimaki et al. ....... | 361/679.55 |
| 7,068,508 | B2 * | 6/2006 | Patel et al. ..................... | 361/699 |
| 7,086,452 | B1 * | 8/2006 | Senyk et al. .................. | 165/80.4 |
| 7,403,384 | B2 * | 7/2008 | Pflueger ........................ | 361/688 |
| 7,872,864 | B2 * | 1/2011 | Mongia et al. ................ | 361/695 |
| 2003/0039097 | A1 * | 2/2003 | Igarashi ........................ | 361/687 |
| 2003/0061824 | A1 * | 4/2003 | Marsala ......................... | 62/119 |
| 2003/0123223 | A1 * | 7/2003 | Pokharna et al. ............. | 361/687 |
| 2003/0147216 | A1 * | 8/2003 | Patel et al. ..................... | 361/700 |
| 2004/0008483 | A1 * | 1/2004 | Cheon .......................... | 361/687 |
| 2005/0083647 | A1 * | 4/2005 | Neho et al. .................... | 361/687 |
| 2005/0122678 | A1 * | 6/2005 | Patel et al. .................... | 361/687 |
| 2005/0161197 | A1 * | 7/2005 | Rapaich ....................... | 165/80.4 |
| 2006/0133031 | A1 | 6/2006 | Hara et al. | |
| 2006/0272803 | A1 * | 12/2006 | Senyk et al. .................. | 165/287 |
| 2009/0126910 | A1 * | 5/2009 | Campbell et al. ......... | 165/104.33 |
| 2010/0079940 | A1 * | 4/2010 | Mongia et al. ........... | 361/679.49 |
| 2010/0305775 | A1 * | 12/2010 | Bean et al. .................... | 700/300 |
| 2012/0147553 | A1 * | 6/2012 | Eriksen .................... | 361/679.53 |

FOREIGN PATENT DOCUMENTS

| | | |
|---|---|---|
| JP | 05-073174 A | 3/1993 |
| JP | 2000-216574 A | 8/2000 |

(Continued)

OTHER PUBLICATIONS

Japanese Office Action mailed Apr. 23, 2013 for corresponding Japanese Application No. 2009-258578, with English-language translation.

*Primary Examiner* — Anatoly Vortman
(74) *Attorney, Agent, or Firm* — Fujitsu Patent Center (57) ABSTRACT

An electronic apparatus includes, an apparatus casing detachably connected to another electronic apparatus, a heat receiver having a flow passage of a cooling medium and assembled in the apparatus casing, and an cooling-medium input and output unit connecting the flow passage of the heat receiver to a circulatory pathway of the cooling medium, the circulatory pathway including a heat exchange taking heat from the cooling medium outside the apparatus casing.

5 Claims, 6 Drawing Sheets

FOREIGN PATENT DOCUMENTS

| | | |
|---|---|---|
| JP | 2001-005573 A | 1/2001 |
| JP | 2002-016386 A | 1/2002 |
| JP | 2002-258986 | 9/2002 |
| JP | 2006-302223 | 11/2006 |
| WO | WO-2004/066133 A1 | 8/2004 |

* cited by examiner

LIQUID COOLING ARRANGEMENT FOR ELECTRONIC APPARATUS

CROSS-REFERENCE TO RELATED APPLICATIONS

This application is based upon and claims the benefit of priority of the prior Japanese Patent Application No. 2009-258578, filed on Nov. 12, 2009, the entire contents of which are incorporated herein by reference.

BACKGROUND

A function expansion unit such as a port replicator or a docking station for a notebook computer is widely known. The function expansion unit receives the notebook computer on an external surface. A connector arranged on the surface of the function expansion unit is connected to a connector of the notebook computer. A variety of peripheral devices are connected to the notebook computer using the function expansion unit, as described in Japanese Unexamined Patent Application Publication No. 1993-73174, Japanese Unexamined Patent Application Publication No. 2001-5573, Japanese Unexamined Patent Application Publication No. 2002-16386, and Japanese Unexamined Patent Application Publication No. 2000-216574.

SUMMARY

According to an aspect of the invention, an electronic apparatus includes, an apparatus casing detachably connected to another electronic apparatus, a heat receiver having a passage for the flow of a cooling medium and assembled in the apparatus casing, and an cooling-medium input and output unit connecting the flow passage of the heat receiver to a circulatory pathway of the cooling medium, the circulatory pathway including a heat exchange taking heat from the cooling medium outside the apparatus casing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

One embodiment of the present invention is described below with reference to the drawings.

Figure 1:
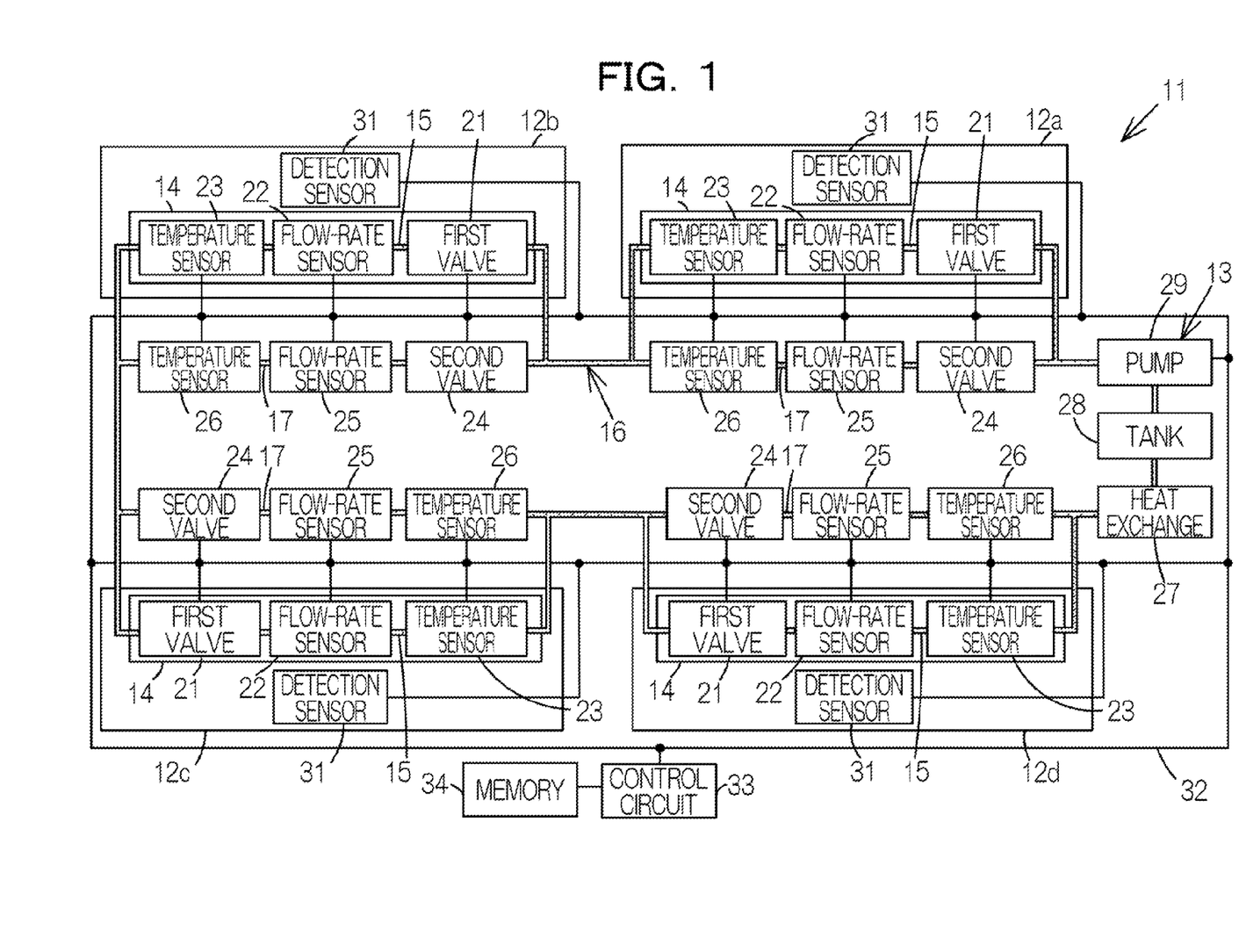
FIG. 1 is a block diagram diagrammatically illustrating a structure of a function expansion unit of an embodiment of the present invention.

FIG. 1 diagrammatically illustrates a function expansion unit system 11 of the embodiment. The function expansion unit system 11 includes four electronic apparatuses, namely, the first through fourth function expansion units 12*a*-12*d*. The function expansion units 12 include a docking station, a port replicator, and a cradle. For example, the function expansion unit 12 expands a function of another electronic apparatus such as a notebook computer or a personal digital assistant (PDA), based on a connection with the other electronic apparatus. In accordance with the embodiment, the function expansion unit 12 may, for example, be located on top of a desk in a room. Alternatively, the function expansion unit 12 may be attached to the desk top.

The function expansion unit system 11 includes a liquid-cooling unit 13. The liquid-cooling unit 13 includes a heat receiver 14 in each of the first through fourth function expansion units 12*a*-12*d*. A liquid passage 15 is formed in the heat receiver 14. A circulatory pathway 16 of a cooling medium is formed in the liquid-cooling unit 13. The cooling medium is circulated through the circulatory pathway 16 via the first function expansion unit 12*a* through the fourth function expansion unit 12*d* in that order. Parallel paths 17 are arranged in the circulatory pathway 16. The parallel path 17 is connected in parallel with the flow passage 15. The parallel path 17 here is arranged outside the function expansion unit 12. One parallel path 17 corresponds to one flow passage 15. A propylene-glycol based antifreeze liquid may be used for the cooling medium.

The flow passage 15 includes a first valve 21, a flow-rate sensor 22, and a temperature sensor 23. The first valve 21, the flow-rate sensor 22 and the temperature sensor 23 are housed in the function expansion unit 12. The first valve 21 controls a flow rate of a cooling medium through the flow passage 15 by opening and closing itself. For example, the first valve 21 when closed blocks the flow of the cooling medium through the flow passage 15. The flow-rate sensor 22 detects a flow rate of the cooling medium flowing through the flow passage 15. The flow-rate sensor 22 outputs flow-rate information identifying the flow rate of the cooling medium. The temperature sensor 23 detects a temperature of the cooling medium flowing through the flow passage 15. The temperature sensor 23 then outputs temperature information identifying the temperature of the cooling medium.

A second valve 24, a flow-rate sensor 25, and a temperature sensor 26 are arranged in the parallel path 17. The second valve 24, the flow-rate sensor 25, and the temperature sensor 26 are arranged external to the function expansion unit 12. In response to the open status and the close status, the second valve 24 controls a flow rate of the cooling medium through the parallel path 17. In response to the close state, the second valve 24 blocks the flow of the cooling medium through the parallel path 17. The flow-rate sensor 25 detects a flow rate of the cooling medium flowing through the parallel path 17. The flow-rate sensor 25 outputs flow-rate information identifying the flow rate of the cooling medium. The temperature sensor 26 detects a temperature of the cooling medium flowing through the parallel path 17. The temperature sensor 26 then outputs temperature information identifying the temperature of the cooling medium.

The liquid-cooling unit 13 includes a heat exchange 27 included in the circulatory pathway 16. The heat exchange 27 is connected to the heat receiver 14 of the fourth function expansion unit 12*d* downstream of the fourth function expansion unit 12*d*. The heat exchange 27 is arranged external to the function expansion unit 12. For example, the heat exchange 27 here is installed outside a room that houses the function expansion unit 12. A fan (not illustrated) is connected to the heat exchange 27. The fan generates air flow to be directed to the heat exchange 27. Heat energy is transferred from the cooling medium to the heat exchange 27 and is then emitted to the atmosphere from the heat exchange 27. The temperature of the cooling medium is thus lowered. Since the heat exchange 27 is installed outside the room, discharge of the heat energy within the room is avoided. A rise in temperature in the room is thus controlled.

The liquid-cooling unit 13 includes a tank 28 and a pump 29 included in the circulatory pathway 16. The tank 28 is connected to the downstream end of the heat exchange 27. The tank 28 stores the cooling medium and air in the circulatory pathway 16. With the tank 28 operating, ingress of air into the pump 29 is prevented. The pump 29 is connected to the downstream end of the tank 28. Connected to the downstream end of the pump 29 is the heat receiver 14 of the first function expansion unit 12a. With the pump 29 operating, the tank 28 supplies the cooling medium to the pump 29 while the pump 29 discharges the cooling medium to the first function expansion unit 12a. The pump 29 circulates the cooling medium in this way through the circulatory pathway 16.

Elastic tubes are used to connect one heat receiver 14 to another heat receiver 14, the heat receiver 14 to the heat exchange 27, the heat exchange 27 to the tank 28, the tank 28 to the pump 29, and the pump 29 to the heat receiver 14. Each of the elastic tube receives metal tubes, namely, nipples of each of the heat receivers 14, the heat exchange 27, the tank 28, and the pump 29. In this way, the elastic tubes are connected to the nipples. The elastic tube may be fabricated of a flexible elastomeric resin such as rubber. Elasticity of the elastic tube permits relative positional displacement of each of the heat receiver 14, the heat exchange 27, the tank 28 and the pump 29. If the function expansion unit 12 is fixed onto a desk top, a metal tube may be used in place of the elastic tube.

A detection sensor 31 may be included in the function expansion unit 12. The detection sensor 31 detects connection or disconnection of an electronic apparatus to the function expansion unit 12. The detection sensor 31 then outputs connection information identifying the connection or the disconnection of the electronic apparatus. A control circuit 33 in the function expansion unit system 11 is connected to the first and second valves 21 and 24, the flow-rate sensors 22 and 25, the temperature sensors 23 and 26, and the detection sensors 31. In the connection, a local area network (LAN) 32 may be established, for example. The LAN 32 connects to the pump 29 of the liquid-cooling unit 13. The LAN 32 may be wireless or wired network. Alternatively, the LAN 32 may be a combination of wireless and wired networks.

The control circuit 33 controls turning on/off the liquid-cooling unit 13, i.e., the pump 29. In the control operation, the pump 29 receives a drive signal. The control circuit 33 thus controls the operation of the liquid-cooling unit 13. On the other hand, the control circuit 33 receives flow-rate information, temperature information, and connection information from the flow-rate sensors 22 and 25, the temperature sensors 23 and 26, and the detection sensors 31, respectively. In response to these pieces of information, the control circuit 33 controls the opening and closing of the first valve 21 and the second valve 24. In the control operation, the first valve 21 and the second valve 24 receive drive signals. The control circuit 33 controls the operation of the function expansion unit system 11.

The control circuit 33 controls the operation of the function expansion unit system 11 in accordance with a control software program of the function expansion unit system 11. The control software program is stored on a memory 34, for example. A control process to be described below is executed in accordance with the control software program. Data used in the control process is stored on the memory 34. The memory 34 may also store a control software program and data from another storage medium. The other storage medium may include a high-capacity storage such as a hard disk drive (HDD).

Figure 2:
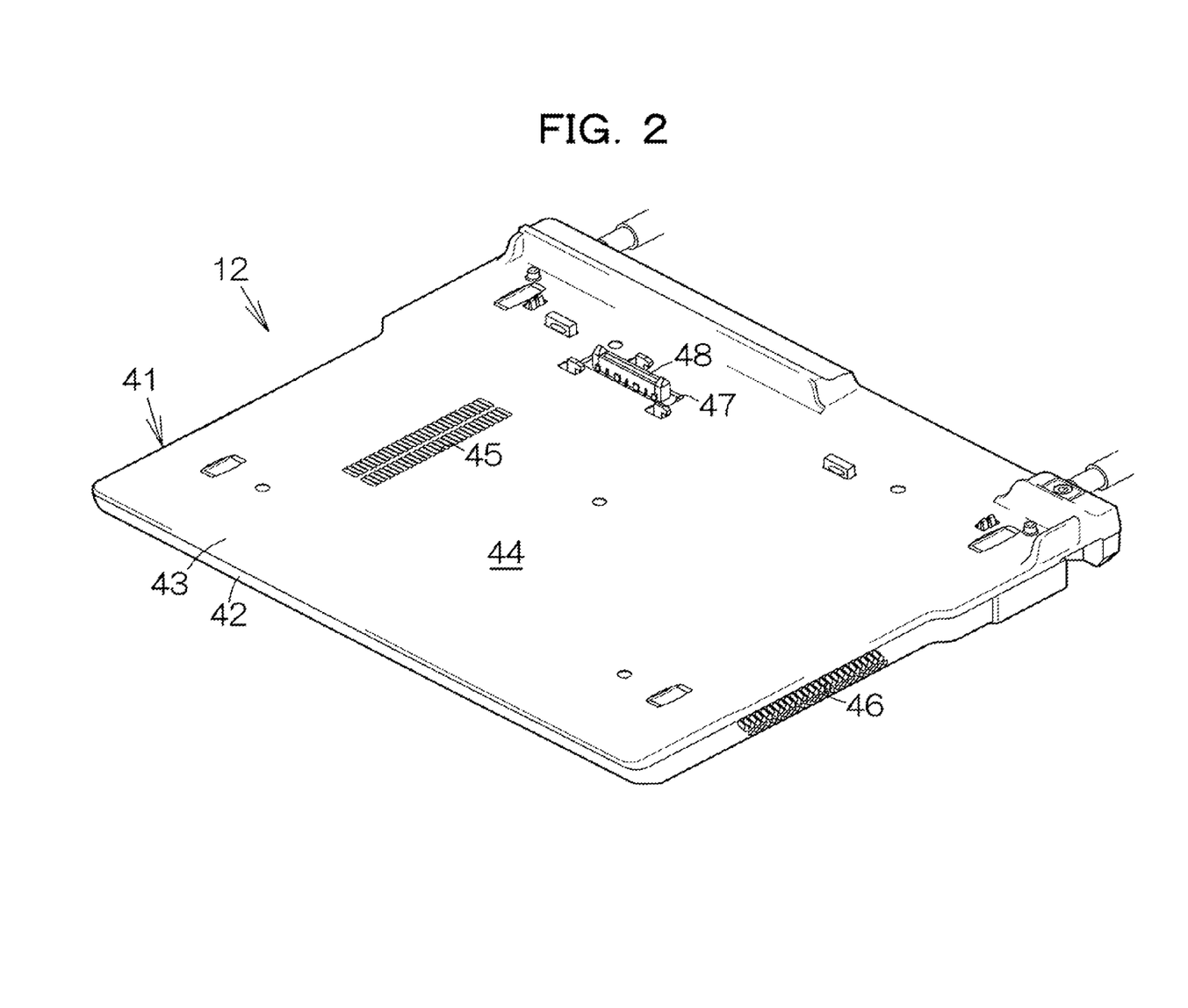
FIG. 2 is a perspective view diagrammatically illustrating the structure of the function expansion unit.

FIG. 2 illustrates an external appearance of the function expansion unit 12. The function expansion unit 12 includes a flat rectangular casing 41. The casing 41 includes a base 42 placed, for example, on top of a desk, and a cover 43 attached to the base 42. A receiving surface 44 is formed on the top surface of the cover 43. The receiving surface 44 is slanted at a specific inclination angle with respect to a horizontal plane. From the rear end to the front end of the casing 41 the receiving surface 44 becomes closer to the bottom surface of the base 42. Another electronic apparatus such as a notebook computer is placed on the receiving surface 44. A discharge vent 45 is arranged at a specific position of the receiving surface 44 on the cover 43. On the other hand, an intake vent 46 is formed on the side face of the casing 41. The casing 41 is fabricated of a reinforced resin such as polycarbonate.

The function expansion unit 12 includes a connector 48 arranged in an opening 47 defined in the receiving surface 44 of the cover 43. The connector 48 is projected upward out of the receiving surface 44. Also referring to FIG. 3, the connector 48 is mounted on the surface of a printed board 49 fixed on the bottom surface of the base 42. Placed on the rear end face of the base 42 are a plurality of connectors 51 including a universal serial bus (USB) connector, a local-area network (LAN) connector, and an alternating current (AC) power connector. The connectors 51 are mounted on the printed board 49. The connectors 51 are thus placed on the rear side of the casing 41. Connected to the connectors 51 are peripheral devices including a mouse, a keyboard, a projector, and a printer.

Figure 3:
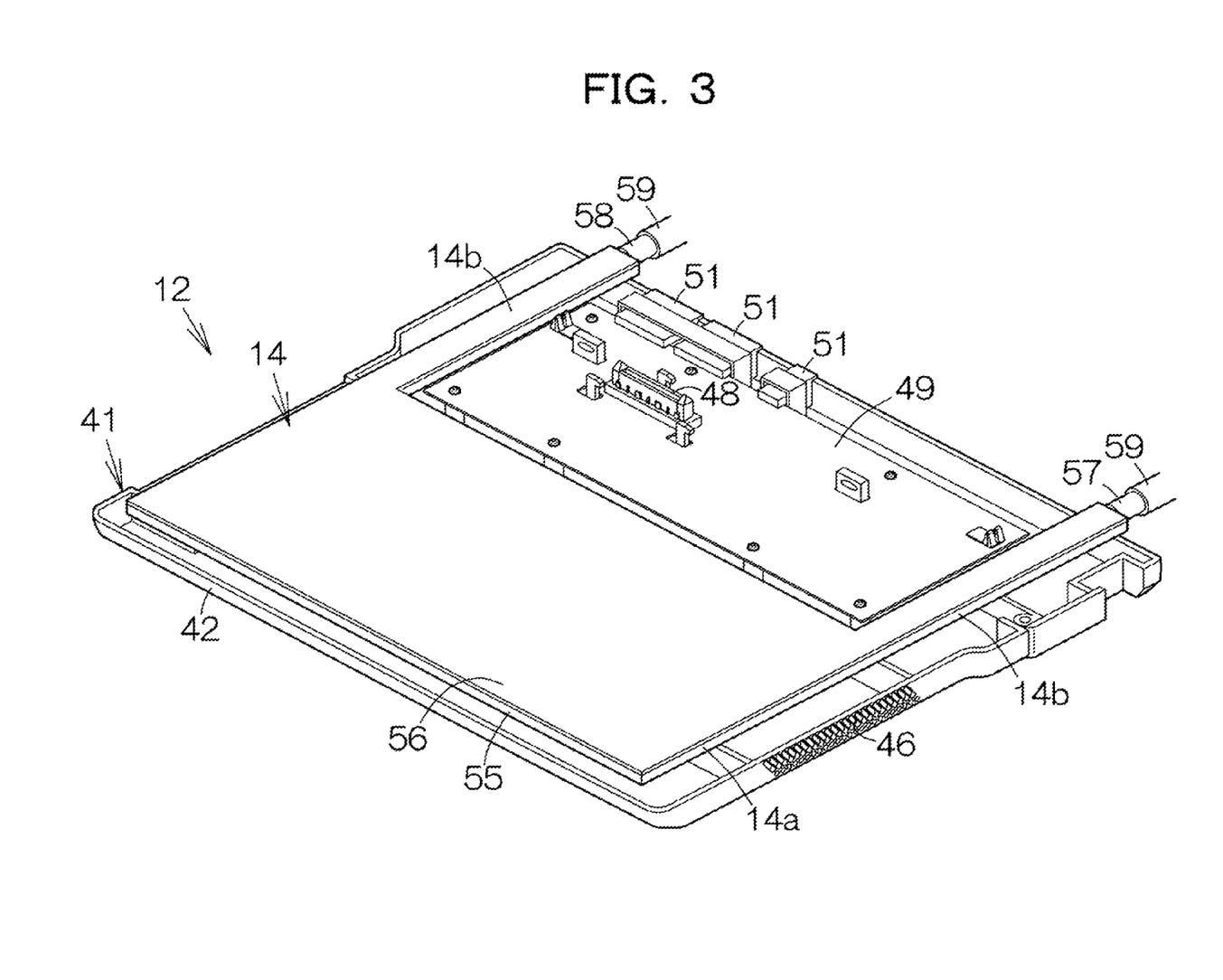
FIG. 3 is an exploded perspective view diagrammatically illustrating the structure of the function expansion unit.

The heat receiver 14 is arranged outside the area of the printed board 49 and between the base 42 and the cover 43. The heat receiver 14 is configured in a flat plate. The heat receiver 14 extends over the bottom surface of the base 42. The heat receiver 14 includes a heat receiver body 14a, and a pair of projections 14b extending rearward from the heat receiver body 14a. The heat receiver body 14a is placed in front of the front end of the printed board 49. The projections 14b extend rearward in parallel with the sides of the printed board 49. The heat receiver 14 further includes a base 55 and a cover 56 attached on the surface of the base 55. Each of the base 55 and the cover 56 is configured in a flat plate. The base 55 and the cover 56 are manufactured of a heat-conductive metal material such as aluminum.

Figure 4:
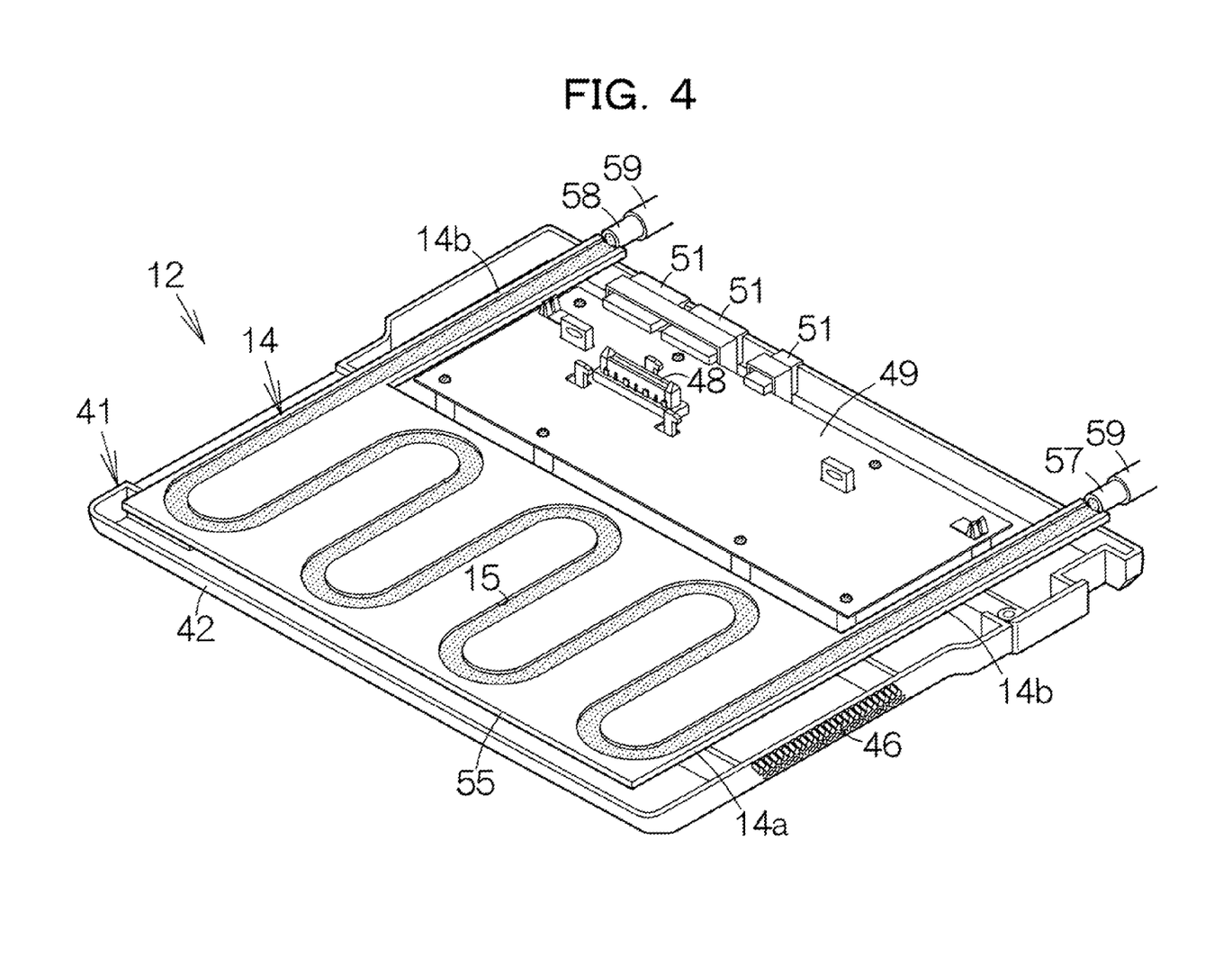
FIG. 4 is an exploded perspective view diagrammatically illustrating the structure of the function expansion unit.

Referring to FIG. 4, the flow passage 15 is arranged in the base 55. The flow passage 15 extends from the rear end of one projection 14b, runs within the heat receiver body 14a, and then reaches to the rear end of the other projection 14b. The flow passage 15 is enclosed within the base 55 and the cover 56. Cooling medium input and output units, namely, nipples 57 and 58 are rigidly attached to the rear ends of the projections 14b, respectively. The nipples 57 and 58 are connected to one end and the other end of the flow passage 15, respectively. The nipples 57 and 58 project out of the casing 41. The nipples 57 and 58 connect the flow passage 15 to the circulatory pathway 16. The flow passage 15 is arranged in a serpentine manner on the surface of the base 55 from the entrance nipple 57 to the exit nipple 58. The cover 56 faces the cover 43 of the function expansion unit 12. The nipples 57 and 58 are respectively connected to elastic tubes 59. The elastic tubes 59 are connected to the parallel paths 17.

Figure 5:
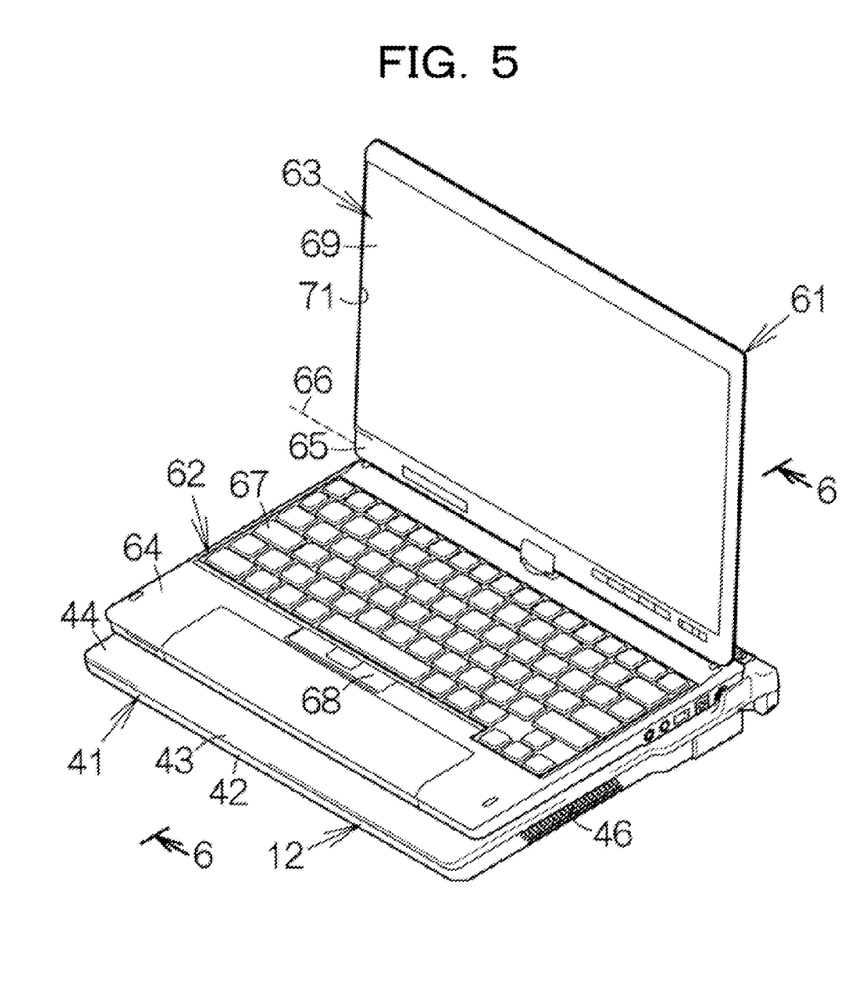
FIG. 5 is a perspective view diagrammatically illustrating an electronic apparatus placed on the function expansion unit.

Referring to FIG. 5, the function expansion unit 12 receives another electronic apparatus, i.e., a notebook computer 61 on the receiving surface 44 of the casing 41. The notebook computer 61 includes an apparatus body 62, and a display 63 connected to the apparatus body 62. The apparatus body 62 includes a body casing 64. The body casing 64 is received on the receiving surface 44. The display 63 includes a display casing 65. The display casing 65 is pivotally supported at a horizontal axis 66 on the body casing 64. The horizontal axis 66 is defined along the rear end of the body casing 64 and in parallel with the body casing 64.

A mother board is housed in the body casing 64. Electronic circuit elements, such as a central processing unit (CPU), and a random-access memory (RAM), are mounted on the mother board. The CPU performs a variety of arithmetic processes in accordance with an application software program temporarily stored on the RAM. The application software program may be stored on a high-capacity storage such as a hard disk drive (HDD) housed in the body casing 64. Input devices, such as a keyboard 67 and an input button 68, are arranged in the surface of the body casing 64. A user of the notebook computer 61 may input a variety of commands and data to the CPU using the input devices 67 and 68.

A flat display panel such as a liquid-crystal display (LCD) panel 69 is arranged in the display casing 65. The display screen of the LCD panel 69 is viewed through a rectangular display opening 71 formed on the display casing 65. A variety of texts and graphics are displayed on the display screen of the LCD panel 69 in response to a CPU operation. The user may verify the operation of the notebook computer 61 in accordance with the texts and graphics.

Figure 6:
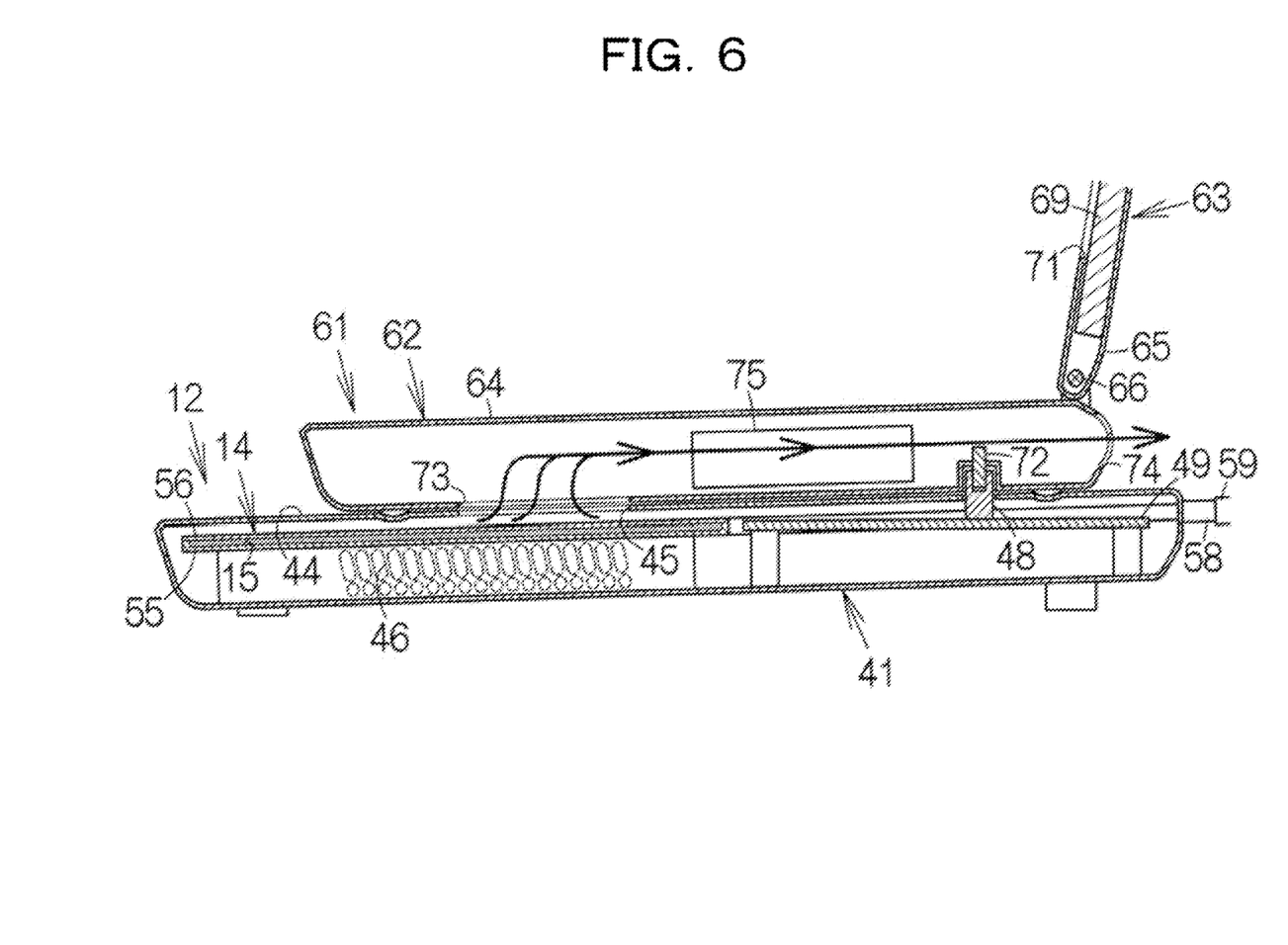
FIG. 6 is a sectional view of the electronic apparatus and the function expansion unit taken along line 6-6 in FIG. 5.

Also referring to FIG. 6, a connector 72 is arranged on the bottom surface of the body casing 64. When the notebook computer 61 is placed, the connector 72 is connected to the connector 48 of the function expansion unit 12. The notebook computer 61 is connected to the function expansion unit 12 in this way. An air intake vent 73 is arranged on the bottom surface of the body casing 64. The air intake vent 73 faces the discharge vent 45 of the function expansion unit 12. A discharge vent 74 is arranged on the side wall of the body casing 64. A fan 75 is housed in the body casing 64. The fan 75 generates air flow moving from the air intake vent 73 to the discharge vent 74. As a result, air is introduced through the air intake vent 73 to within the body casing 64. The introduced air is discharged through the discharge vent 74 of the body casing 64.

When the notebook computer 61 is connected to the function expansion unit 12, a current flows from the notebook computer 61 to the function expansion unit 12 via the connectors 48 and 72. The current flows back to the notebook computer 61 after flowing through the printed board 49. The detection sensor 31 thus detects the current. The CPU detects the connection with the function expansion unit 12. The CPU switches the application software program to the setting with the function expansion unit 12. The connection between the notebook computer 61 and the function expansion unit 12 is thus established. If the peripheral devices are connected to the function expansion unit 12, the user can use the peripheral devices.

The function expansion unit system 11 may now operate. In an initial setting, the control circuit 33 opens the first valve 21 at an appropriate opening rate in each of the first through fourth function expansion units 12a-12d. The control circuit 33 also opens the second valve 24 at an appropriate opening rate in each of the expansion units. The control circuit 33 causes the pump 29 to be activated. The cooling medium may now flow through the circulatory pathway 16. The flow passage 15 determines a first flow rate. The parallel path 17 determines a second flow rate that is higher than the first flow rate. An extremely small value may be set for the first flow rate. As a result, most of the cooling medium flows through the parallel path 17. The cooling medium thus circulates through the circulatory pathway 16. With the pump 29 operating, the flow rate of the cooling medium flowing through the circulatory pathway 16 remains constant.

The flow-rate sensors 22 and 25, and the temperature sensors 23 and 26 monitor the flow rate and the temperature of the cooling medium, respectively. The detection sensor 31 monitors the connection or disconnection with the notebook computer 61. The control circuit 33 thus receives the flow-rate information, the temperature information, and the connection information from the flow-rate sensors 22 and 25, the temperature sensors 23 and 26, and the detection sensors 31, respectively. These pieces of information may be output to the control circuit 33 at specific time intervals. The control circuit 33 first monitors the connection information output from the detection sensor 31. For example, in the first valve 21 including the detection sensor 31 outputting the connection information identifying a disconnection, the control circuit 33 maintains the opening rate of the first valve 21 and the opening rate of the second valve 24.

The notebook computer 61 may now be placed on the second function expansion unit 12b. The receiving surface 44 of the casing 41 receives the bottom surface of the body casing 64 of the notebook computer 61. With the receiving surface 44 receiving the body casing 64, the connector 72 of the notebook computer 61 is mated with the connector 48 of the second function expansion unit 12b. If the connectors 48 and 72 are mated with each other, a connection is established between the notebook computer 61 and the second function expansion unit 12b. The detection sensor 31 in the second function expansion unit 12b detects the connection with the notebook computer 61. The detection sensor 31 then outputs the connection information identifying the connection with the notebook computer 61.

The control circuit 33 causes the first valve 21 and the second valve 24 to interchange the flow-rates thereof in the second function expansion unit 12b thus having established the connection. In the second function expansion unit 12b, the cooling medium flows through the flow passage 15 of the heat receiver 14 at the second flow rate. The flow rate of the cooling medium thus increases through the flow passage 15. The cooling medium flows through the parallel path 17 at the first flow rate. The flow rate of the cooling medium flowing through the parallel path 17 thus decreases. The flow rates of the flow passage 15 and the parallel path 17 change in inverse proportion to each other. As a result, the overall flow rate of the cooling medium flowing through the flow passage 15 and the parallel path 17 remains constant. When the notebook computer 61 received on the receiving surface 44 is in operation, the notebook computer 61 emits heat energy to the outside from the body casing 64. The heat energy is transferred to the cooling medium within the heat receiver 14. As a result, air surrounding the heat receiver 14 is cooled. The body casing 64 is generally cooled from the bottom surface thereof.

The fan 75 in the notebook computer 61 also generates air flow from the air intake vent 73 of the body casing 64 to the discharge vent 74. In response to the air flow, air is taken in through the discharge vent 45 of the casing 41 of the second function expansion unit 12b. An air flow routing from the air intake vent 46 to the discharge vent 45 is generated within the casing 41. Air surrounding the heat receiver 14 is cooled by the heat receiver 14 in the casing 41. The air flow cooled is discharged through the discharge vent 45 out of the casing 41. Since the discharge vent 45 faces the air intake vent 73, the cooled air is introduced into the body casing 64 via the air intake vent 73. Heat energy, generated by the mother board for example, is transferred to the cooled air within the body casing 64. Air is then discharged to the outside through the discharge vent 74.

Similarly, the notebook computers 61 may be placed onto the first function expansion unit 12*a* and the third function expansion unit 12*c*. In the first and third function expansion units 12*a* and 12*c*, the opening rates are reversed between the first valve 21 and the second valve 24. The notebook computers 61 are cooled on the first and third function expansion units 12*a* and 12*c*. If the flow-rate sensor 22 of the first function expansion unit 12*a* detects a temperature equal to or higher than a specific threshold value, the control circuit 33 increases the opening rate of the first valve 21. The flow rate increases from the second flow rate. As a result, cooling efficiency of the heat receiver 14 increases. On the other hand, the opening rate of the corresponding second valve 24 decreases. For example, the second valve 24 is closed here. The flow rate is set to zero. The overall flow rate of the flow passage 15 and the parallel path 17 remains constant.

If the flow-rate sensor 22 in the third function expansion unit 12*c* detects a flow rate lower than a specific threshold value, the control circuit 33 detects a fault in the flow passage 15 of the heat receiver 14 in the third function expansion unit 12*c*. In response, the control circuit 33 closes the first valve 21 in the third function expansion unit 12*c* and opens the second valve 24, corresponding to the first valve 21, at a specific opening rate. As a result, the cooling medium flows through the parallel path 17. The overall flow rate of the flow passage 15 and the parallel path 17 remains constant. Via the third function expansion unit 12*c*, the control circuit 33 displays an error message on the display screen of the notebook computer 61 on the third function expansion unit 12*c*. The user of the notebook computer 61 may be alerted to the occurrence of a fault on the third function expansion unit 12*c*.

If the notebook computer 61 is removed from the second function expansion unit 12*b*, the connection between the connectors 48 and 72 is broken. The detection sensor 31 outputs the connection information identifying the disconnection with the notebook computer 61. The control circuit 33 adjusts the opening rate of the first valve 21 and the opening rate of the second valve 24 in the second function expansion unit 12*b*. The first flow rate is determined by the flow passage 15 while the second flow rate is determined by the parallel path 17. With the connection between the connectors 48 and 72 broken, the current path between the notebook computer 61 and the second function expansion unit 12*b* is also broken. The CPU in the notebook computer 61 recognizes the disconnection with the second function expansion unit 12*b*. The CPU then switches the application software program from the connection setting with the second function expansion unit 12*b* to the disconnection setting. The notebook computer 61 is thus fully disconnected from the second function expansion unit 12*b*.

In the function expansion unit system 11 thus constructed, the heat receiver 14 of the liquid-cooling unit 13 is included in each of the first through fourth function expansion units 12*a*-12*d*. With the heat receiver 14 operating, heat energy of the notebook computer 61 placed on the function expansion unit 12 is transferred to the cooling medium. The heat energy is then emitted into the atmosphere via the heat exchange 27 outside the room. An excessive temperature increase within the room is avoided. Energy consumption of an air-conditioning system in the room is reduced, the air-conditioning system's workload is lightened, and the heat energy in the room is thus efficiently managed. The function expansion unit 12 needs neither a heat exchange nor a pump. The structure of the function expansion unit 12 is simplified. The heat energy emitted from the heat exchange 27 may be recycled for room heating.

The parallel path 17 is connected in parallel with the flow passage 15 in the heat receiver 14. The first valve 21 is included in the flow passage 15. The second valve 24 is included in the parallel path 17. The function expansion unit 12 includes the detection sensor 31. The detection sensor 31 outputs the connection information identifying the connection or disconnection with the notebook computer 61. The control circuit 33 controls the first valve 21 and the second valve 24, thereby adjusting the flow rate of the flow passage 15 and the flow rate of the parallel path 17. Through the adjustment operation, the cooling medium may flow through only the flow passage 15 of the function expansion unit 12 having the notebook computer 61 placed thereon. The notebook computer 61 is thus efficiently cooled.

The flow-rate sensors 22 and 25, the temperature sensors 23 and 26 are respectively included in the flow passage 15 and the parallel path 17. If the flow rate of the cooling medium flowing through the flow passage 15 fails to reach the threshold value, a fault may be detected in the flow passage 15. The first valve 21 is thus closed, blocking the flow of the cooling medium through the flow passage 15. The second valve 24 is opened, thereby causing the cooling medium to flow through the parallel path 17. The circulation of the cooling medium through the circulatory pathway 16 is reliably maintained. If the temperature of the cooling medium rises above a threshold value in the flow passage 15, the flow rate of the flow passage 15 is increased through the adjustment of the opening rate of the first valve 21 and the opening rate of the second valve 24. As a result, the cooling efficiency of the notebook computer 61 is increased.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A system comprising:
   a liquid cooling unit including a circulatory pathway for transporting a cooling medium, the circulatory pathway including a first valve and a second valve for adjusting a flow rate of the cooling medium within the circulatory pathway and a heat exchange for taking heat from the cooling medium outside the liquid cooling unit;
   a first expansion unit detachably connected to a first electronic apparatus, the first expansion unit includes a first flow passage for transporting the cooling medium, the first flow passage includes a third valve for adjusting a flow rate of the cooling medium within the first flow passage and, wherein a first cooling-medium input and output unit connects the first flow passage to the circulatory pathway of the liquid cooling unit at a first end and a second end of the first valve;
   a second expansion unit detachably connected to a second electronic apparatus, the second expansion unit includes a second flow passage for transporting the cooling medium, the second flow passage includes a fourth valve for adjusting a flow rate of the cooling medium within second flow passage and, wherein a second cooling-medium input and output unit connects the second flow passage to the circulatory pathway of the liquid cooling unit at a first end and a second end of the second valve; and a control unit configured to adjust the flow rates of the cooling medium with the circulatory pathway, the first flow passage, and the second flow passage by controlling the first, second, third, and fourth valves when the first electronic apparatus is connected to the first expansion unit and the second electronic apparatus is connected to the second expansion unit.

2. The system according to claim 1, wherein the first expansion unit and the second expansion unit each includes a detection sensor detecting a connection or a disconnection with the first electronic apparatus or the second electronic apparatus respectively, and outputting connection information identifying the connection or the disconnection.

3. The system according to claim 1, wherein the first expansion unit and the second expansion unit each includes a temperature sensor detecting a temperature of the cooling medium in the first flow passage and the second flow passage respectively, and outputting temperature information identifying the detected temperature, wherein the control unit further controls the first, second, third, and fourth valves in response to the temperature information.

4. The system according to claim 1, wherein the first expansion unit and the second expansion unit each includes a flow-rate sensor detecting a flow rate of the cooling medium in the first flow passage and the second flow passage respectively, and outputting flow-rate information identifying the detected flow rate, wherein the control unit further controls the first, second, third, and fourth valves in response to the flow-rate information.

5. The system according to claim 1, wherein the flow rate of the cooling medium in the circulatory pathway of the liquid cooling unit is greater than the flow rate of the cooling medium in both the first flow passage and the second flow passage.

* * * * *